United States Patent
Montgomery

(10) Patent No.: US 7,290,133 B1
(45) Date of Patent: Oct. 30, 2007

(54) METHOD AND APPARATUS IMPROVING EFFICIENCY OF END-USER CERTIFICATE VALIDATION

(75) Inventor: David Montgomery, Ottawa (CA)

(73) Assignee: Entrust Limited, Ottawa, Ontario (CA)

( * ) Notice: Subject to any disclaimer, the term of this patent is extended or adjusted under 35 U.S.C. 154(b) by 862 days.

(21) Appl. No.: 09/715,350

(22) Filed: Nov. 17, 2000

(51) Int. Cl.
*H04L 9/00* (2006.01)
*G06F 15/16* (2006.01)
*G06F 17/00* (2006.01)

(52) U.S. Cl. ...................... 713/156; 713/175
(58) Field of Classification Search ............. 713/156, 713/157, 175; 709/203; 726/6, 10, 18
See application file for complete search history.

(56) References Cited

U.S. PATENT DOCUMENTS

| | | | |
|---|---|---|---|
| 5,220,604 A | 6/1993 | Gasser et al. | |
| 5,224,163 A | 6/1993 | Gasser et al. | |
| 5,315,657 A | 5/1994 | Abadi et al. | |
| 5,666,416 A | 9/1997 | Micali | |
| 5,671,280 A | 9/1997 | Rosen | |
| 5,687,235 A | 11/1997 | Perlman et al. | |
| 5,745,574 A | 4/1998 | Muftic | |
| 5,745,886 A | 4/1998 | Rosen | |
| 5,958,050 A * | 9/1999 | Griffin et al. | 713/200 |
| 6,134,550 A | 10/2000 | Van Oorschot et al. | |
| 6,247,127 B1 * | 6/2001 | Vandergeest | 713/100 |
| 6,304,974 B1 * | 10/2001 | Samar | 713/201 |
| 6,308,277 B1 * | 10/2001 | Vaeth et al. | 713/201 |
| 6,321,333 B1 * | 11/2001 | Murray | 713/156 |
| 6,539,093 B1 * | 3/2003 | Asad et al. | 380/279 |
| 6,816,900 B1 * | 11/2004 | Vogel et al. | 709/225 |
| 2005/0081037 A1 * | 4/2005 | Kumagai et al. | 713/175 |

OTHER PUBLICATIONS

Menezes, Alfred J. et al. Handbook of Applied Cryptography, 1997 CRC Press, pp. 559-581.*

(Continued)

*Primary Examiner*—Gilberto Barron
*Assistant Examiner*—Michael J Simitoski
(74) *Attorney, Agent, or Firm*—Vedder, Price, Kaufman & Kammholz, P.C.

(57) ABSTRACT

An apparatus and method collects, for a community of interest, at least one cross certificate associated with an anchor certificate issuing unit, and obtains at least one certificate issuing unit public key and an associated unique identifier for a cross-certified certificate issuing unit identified by the at least one cross certificate. For example, a certificate issuing unit, client unit, or other suitable unit, searches for one or up to all certification authorities or certificate issuing units that it can trust based on cross certificate chains. This is done, for example, from a given trust anchor. The apparatus selects those obtained certificates that satisfy, for example, some search criteria, such as what policy must be enforced in each certificate, for example, the allowed path length or depth that the apparatus is allowed to evaluate, and creates a signed certificate set, such as a list of all trusted certificate issuing units from the perspective of a given trust anchor. Accordingly, the apparatus and method creates a signed certificate set identifying certificate issuing units determined to be trusted by the anchor certificate issuing unit based on the cross certificates that the apparatus obtained. The signed certificate set includes at least a unique identifier of each trusted certificate issuing unit, such as the distinguished name (DN) of the certificate issuing unit, and public key of each trusted certificate issuing unit.

36 Claims, 4 Drawing Sheets

OTHER PUBLICATIONS

Burr, Bill. "Federal Bridge CA Concept", May 2000.*
Gunter, Carl A. et al. "Policy-directed Certificate Retrieval", Mar. 2000.*
Menezes et al. Handbook of Applied Cryptography, 1997, chapter 13.*
Network Associates, Inc. An Introduction to Cryptography, 1999.*
Polk, William T. "Bridge Certification Authorities: Connecting B2B Public Key Infrastructures", Sep. 2000.*
Shimaoka, Masaki. "Memorandum for multi-domain PKI interoperability", 2000.*
Stillson, Ken. "Dynamic Bridge Concept", 3rd Annual PKI R&D Workshop, 2004.*
Zimmermann, Philip. "PGP(tm) User's Guide Volume I: Essential Topics", Oct. 1994.*
Handbook of Applied Cryptography, Alfred Menezes et al, (1997), pp. 572-576.
PKI Architectures and Interoperability, preliminary draft for Federal PKI TWG, by W.E Burr, published on the World Wide Web, Mar. 6, 1998.
Toward a National Public Key Infrastructure, IEEE Communications Magazine, Sep. 1994 by Santosh Chokani, pp. 70-74.
Data Structures and Algorithms, Alfred V. Aho et al., (1983), Addison Wesley Publishing Company, pp. 215-218 and pp. 239-244.
Graph Theory With Applications, J. A. Bondy and U.S.R. Murty, (1981), pp. 14-21.
Levi et al., "Verification of classical certificates via nested certificates nested certificate paths," Computer Communications and Networks, 1999, Proceedings, Eighth International Conference on, pp. 242-247.
Xu et al., "Certificate path generating protocol (CPGP) for authentic signaling in ATM networks," Network Protocols, 1998, Proceedings, Sixth International Conference on, pp. 282-289.
Reiter et al., "Resilient authentication using path independence," Computers, IEEE Transactions on, pp. 1351-1362.

* cited by examiner

CENTRALIZED SCS GENERATION AND RETRIEVAL

METHOD AND APPARATUS IMPROVING EFFICIENCY OF END-USER CERTIFICATE VALIDATION

RELATED CO-PENDING APPLICATION

This application is related to co-pending application entitled "Method and Apparatus for Use in Determining Validity of a Certificate in a Communication System Employing Trusted Paths," filed on Mar. 8, 1998, having inventors Paul Van Oorschot et al., having Ser. No. 09/040,744 and assigned to instant assignee.

FIELD OF THE INVENTION

The invention relates generally to computer systems employing cryptographic techniques to secure information, and more particularly to network communication systems using cryptographic techniques that employ certificates.

BACKGROUND OF THE INVENTION

In typical public key cryptography systems, digital signature key pairs, having a private key and public key, are often used to authenticate a digital signature of a subscriber using a software application in order to confirm the identity of the sender of the message. A subscriber may generally be for example a network computer node, a software application or user in the security system. In addition to digital signature key pairs, encryption key pairs are also generally used to encrypt the data being sent from one subscriber to another subscriber within the computer network. Certificates are typically generated by a trusted certification authority for the public keys of the private/public key pair to certify that the keys are genuinely owned by a named subscriber. Standards, such as ISO 9594-8 available from the International Organization for Standardization, define typical certificate content.

In a network community, there may be a multitude of different certification authorities and many subscribers. Generally, each subscriber stores a certification authority public key to verify that a trusted certification authority issued the certificate. A public key certificate typically includes a user public key which is bound by the signature of the certification authority to the subscriber name, and other data including expiry data indicating the expiration date or period for the public key certificate. Each sender (subscriber) has a copy of its own certificate. To send an encrypted message, a sender may access a directory, such as an onboard client cache memory or other certificate storage medium to get a copy of an encryption certificate for a specified receiver. When receiving digitally signed data, a receiver obtains a signature verification certificate and determines from the obtained certificate whether the sender has a valid signature. Generally, for a certificate to be considered valid, the digital signature must be valid and there must be no existing expiration or revocation of the certificate by an associated certification authority. Hence, subscribers typically serve as certificate validation units and validate certificates before encrypting information to other subscribers. Similarly, the subscribers also need to verify signature verification certificates before using a public key to validate a subscriber's signature.

In computer network systems that employ cryptography, the certification authority, also referred to herein as the certificate issuing unit, typically issues certificates for subscribers that use the associated certification authority as the primary trusted server. Alternatively, in some systems a trusted subscriber may play the role of a CA in generating and signing certificates of other subscribers. In larger networks, the trust relationships between the certification authorities typically involve multiple certification authorities. Trust relationships between certification authorities determine how certificates issued by one certification authority may be utilized or verified by entities certified by distinct certification authorities such as those in other networks. Since public key certificates provide a mechanism for obtaining authenticated public keys, provided the verifier has a trusted verification public key of the certification authority which signed the certificate, trusted paths may be established and maintained among the certification authorities and hence subscribers in large computer networks. In the case of multiple certification authorities, a certificate verification unit, such as a subscriber, may wish to obtain an authentic public key by verifying a certificate signed by a certification authority other than one for which it originally possesses a trusted public key. In this case, the verifier may still verify a certificate signed by other certification authorities provided a chain of certificates can be constructed which corresponds to an unbroken chain of trust from the certification authority public key which the verification unit does trust, to the public key it wishes to obtain trust in.

Conventional cryptographic systems, such as many public key cryptography systems, typically use a distributed directory where all certificates and certificate revocation lists are duplicated so each subscriber in a system can access the directory to perform validation. Certificate chains correspond to directed trust paths, also known as certification paths, such as trust relationships among certification authorities where at least one certification authority (CA) has certified another certification authority. A certificate containing the public key of a certification authority is called a CA-certificate. A CA-certificate resulting from one CA certifying another CA is called a cross-certificate, and the process of creating such a certificate is called cross-certification. In this case the CA which signs the certificate is different from the CA whose public key appears within the certificate. A CA-certificate may be either a cross-certificate or a self-signed certificate (where the latter is a CA-certificate signed by the same CA whose public key is within the certificate). Unilateral certification occurs where one certification authority certifies another certification authority but reciprocal certification does not occur. Where a pair of certification authorities certify each other, this is referred to as mutual cross-certification. In this case, the two corresponding cross-certificates are called a cross-certificate pair.

To ensure validity of a subscriber's public key, so that a subscriber may receive or send information along a fully trusted path, the goal for a verification unit is to find a sequence of certificates corresponding to a certification path starting at the certification authority whose public key the subscriber trusts directly (i.e., an anchor certificate issuing unit), and ending at a target certification authority which has signed the certificate of the public key to be verified. If the search for trusted paths is carried out using conventional search techniques, such as breadth first or depth first techniques as known in the art (see for example page 215-218 and 239-244 in "Data Structures and Algorithms", by Alfred V. Aho, John E. Hopcroft, and Jeffrey D. Ullman, published in 1983 by Addison-Wesley, Reading, Mass., incorporated herein by reference), then a problem arises by way of reduced system performance when large numbers of certification authorities are in the community of interest, and many different combinations of links among certification authorities in various networks (or the same network) exist. In such systems, a verification unit may spend valuable processing time verifying all combinations of links to determine whether a trusted path has been maintained with the certification authority of the verifying verification unit and the certificate issuing unit that issued the target certificate. An inefficiency results when many of the steps involved in an exhaustive search which explores a large number of network nodes, for example in a breadth-first search, end up leading to untrusted or non-existent paths, and therefore unnecessarily consumed computational effort. For example, the validation unit typically has to find the certification paths every time a signed electronic document is received or any time an encryption occurs; checking a large number of possible certification authority paths can be unnecessary and can take long periods of time thereby decreasing the system performance. In large systems, the performance may be so impeded as to render the validation unit impractical.

Hierarchical chain trust structures with one way and/or mutual cross-certification among certificate issuing units typically have verification units verify in the following manner. Each entity or verification unit starts with a trusted public key, for example the public key of the certificate issuing unit which created its own certificate (anchor CA). The shortest trust chain from any entity is a path in the tree which travels upward from the parent to a least common ancestor of the entity and a target entity, and then onwards back down to the target entity. However, if any CA-certificate or cross-certificate in that particular path has been revoked, has expired, or does not meet policy constraints as required by the anchor CA, that path must be discarded and another trust chain must be sought. In addition, the trust relationships between certificate issuing units may not be strictly hierarchical, in which case other valid paths may exist. Therefore, substantial entity resources can be expended in analyzing all of the possible certification links where a network contains a large number of certification authorities.

Typically, a client engine or other unit that must validate a message from a sending unit, must typically search for, obtain and validate a chain of certificates required to validate a given end-user certificate for which typically requires the client engine to validate all certificates of issuing units that are trusted as determined by cross certificates. This can become an enormous task, particularly with large network systems. The client engine typically repeats this chain construction for each end-user certificate often with little memory of previous constructions. In addition, with conventional systems, when validating an end-user's certificate issued by, for example, a foreign certificate issuer (a certificate issuing unit that is not the validating unit's trust anchor), a client engine will construct a certificate chain from a suitable trust anchor to the end-user certificate. This generally involves retrieval and validation of each cross certificate in the certificate chain. This process is typically repeated for each end-user certificate. Although the client engine may cache cross certificates, and corresponding revocation information pertaining to those certificates, the retrieval, chain construction and validation of each cross certificate must typically still be performed by the client engine in order to validate an end user certificate. The caching operation may save the client engine some network accesses, but typically not the computational mode.

Accordingly, a problem arises since a client engine would be required to build a certificate chain in order to validate an end-user certificate. This can be time consuming, especially from a constrained client engine perspective, based on a potentially large computational and network access costs. In addition, the client engines typically may store the last chain construction but not store beyond the optional caching of cross certificates and corresponding revocation information. In a typical example, for the consecutive revocation of two end-user certificates verifiable using the same certificate chain, the client engine typically still rebuilds the certificate chain and validates each cross certificate from a cache of information when validating the second certificate.

Accordingly, a need exists for an improved method and apparatus for a more efficient end-user certificate validation in systems employing certificates and trusted paths.

DETAILED DESCRIPTION OF THE PREFERRED EMBODIMENT

Figure 1:
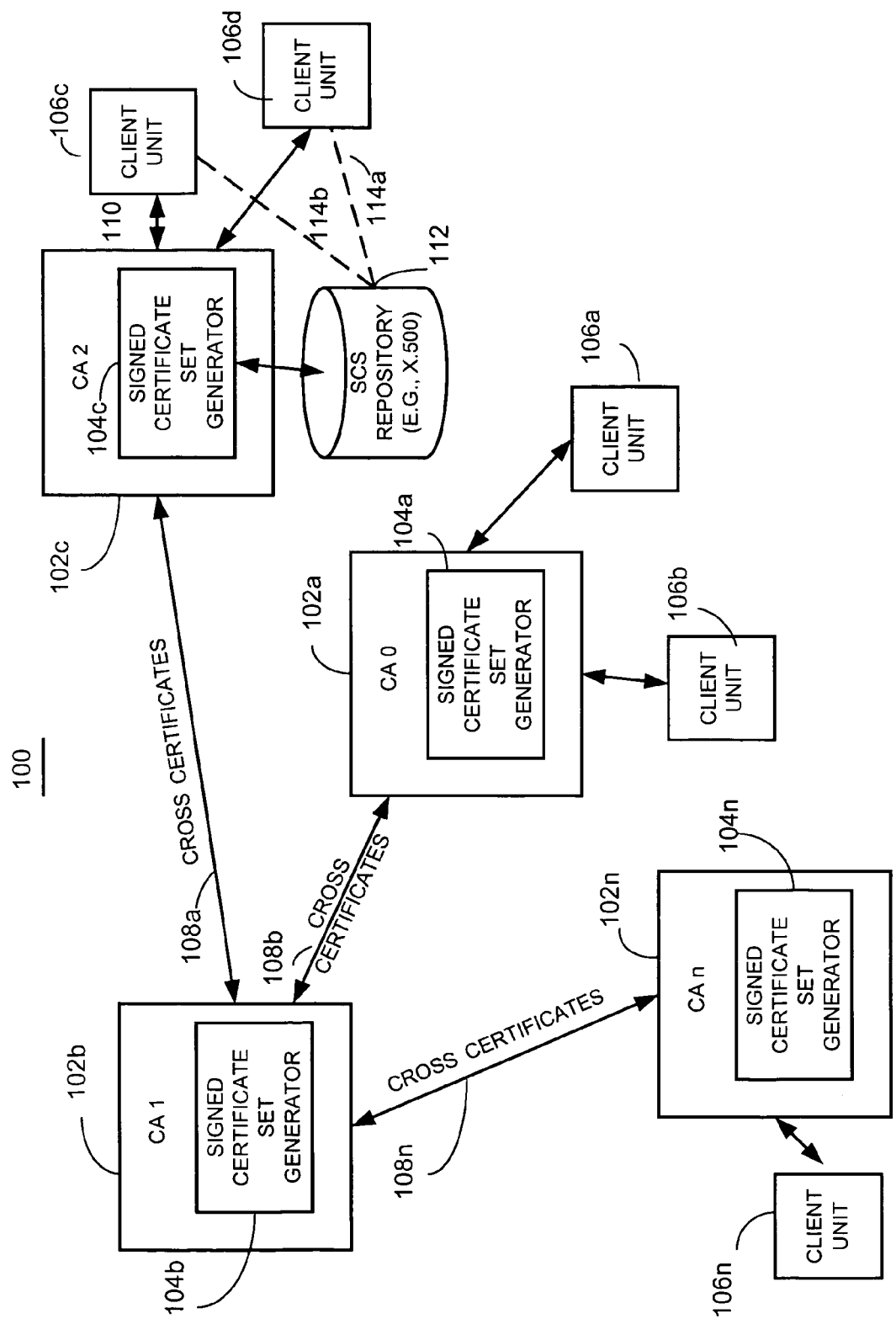
FIG. 1 is a block diagram illustrating one example of a trusted public key certificate system employing a signed certificate set generator in accordance with one embodiment of the invention.

Briefly, an apparatus and method collects, for a community of interest, at least one cross certificate associated with an anchor certificate issuing unit, and obtains at least one certificate issuing unit public key and an associated unique identifier for a cross-certified certificate issuing unit identified by the at least one cross certificate. For example, a certificate issuing unit, client engine or other suitable unit, searches for one or up to all certification authorities or certificate issuing units that it can reach based on chains of cross certificates to obtain, from one or more cross certificates, a plurality of public keys and associated unique identifiers for certificate issuing unit certificates that are trusted, for example, from the perspective of a given trust anchor. The apparatus selects those obtained certificates that satisfy, for example, some search criteria, such as what policy must be enforced in each cross certificate and CA-certificate, or, for example, the allowed path length or depth that the apparatus is allowed to evaluate. Accordingly, the apparatus and method creates a signed certificate set identifying certificate issuing units determined to be trusted by the anchor certificate issuing unit based on the cross certificates that the apparatus obtained. The signed certificate set includes at least a unique identifier, such as a certificate distinguished name (DN), and public key of each trusted certificate issuing unit.

In one embodiment, the signed certificate set is signed by, for example, the unit performing the validation of the cross certificates, or other suitable trusted unit, and creates the signed certificate set to include general information in the form of a certificate or other suitable data structure that includes, for example, the trust anchor used, a serial number for the certificate or signed certificate set, a validity period for the certificate or signed certificate set, information for each trusted certification authority including, for example, an identifier for each trusted certification authority (e.g., their DN) and an appropriate trusted CA certificate, or, if desirable, just the verification public key of the trusted CA and an identifier for the public key (e.g. the DN of the trusted CA along with, for example, the subject key identifier of the public key in the CA-certificate that contains the public key), or, if desirable, just a secure hash of the public key, along with an identifier for the public key (e.g. the DN of the trusted CA along with, for example, the subject key identifier in the CA-certificate that contains the public key or the serial number of the CA-certificate).

In another embodiment, the method and apparatus includes creating a signed certificate set revocation list that may be archived for future use. As an example, a client engine may, for example, retrieve a signed certificate set, for an appropriate trust anchor, from a central repository or from any suitable source, and store the retrieved signed certificate set until that particular set expires based on its validity period or is revoked. To validate an end-user certificate, the client engine searches in the signed certificate set for the identifier of the public key that signed the end user certificate (e.g. the DN of the CA that issued the end-user certificate along with the authority key identifier of the end-user certificate). If found, the CA certificate or simply the public key corresponding to the issuer of the end-user certificate is used to validate the signature on the end-user certificate. If not found, then the client engine may indicate that the certificate is not trustworthy or may choose to use other means to validate the certificate. Accordingly, a client engine or receiving engine may validate end entity certificates without requiring chain construction or obtaining chain information, such as CA-certificates or cross certificates, or validation of CA-certificates or cross-certificates by the client engine. If the client engine can cache the signed certificate set, or import certificates directly from the trusted signed certificate set into its own certificate trust list, a client engine can more efficiently validate messages from senders in a given system.

In another embodiment, the method and apparatus centrally creates a plurality of signed certificate sets on a per anchor certificate issuing unit basis wherein each signed certificate set contains at least, for example, a signed set of unique identifiers and associated public keys of each certificate issuing unit trusted by an anchor certificate issuing unit. If desired, instead of storing, for example, the public keys or the CA certificates of trusted certificate issuing units in the signed certificate set, an identifier of such information (e.g. a DN of the certificate issuing unit and a key identifier) along with a secure hash of that information may also be used.

If desired, the signed certificate set is created by removing the CAs that do not meet specified policy requirements based on, for example, policy identification data present in the certificate associated with the CA being validated, in the cross-certificates, in the CA-certificate of the trust anchor, or in the attribute certificate associated with a particular of end-user of group of end-users FIG. 1 depicts one example of a trusted public key certificate system 100 that employs at least one signed certificate set in accordance with one embodiment of the invention. The system 100 includes a number of certificate issuing units 102a-102n such as certification authorities, for issuing public key certificates, attribute certificates or any other suitable certificates or data structures. The system 100 also includes a plurality of signed certificate set generators 104a-104n, each associated with a respective certificate issuing unit 102a-102n, and a plurality of message receiving units, such as client units 106a-106n. In this example, certificate issuing unit 102a is the anchor certificate issuing unit for client units 106a and 106b. Similarly, the certificate issuing unit 102c is the anchor certificate issuing unit for client units 106c and 106d, and certificate issuing unit 102n is an anchor certificate issuing unit for client unit 106n (additional or fewer). Certificate issuing units and client units may also be included in the system, but are not shown. In this example, the client units 106a-106n may be, for example, but are not limited to, executing software applications, or any suitable processing unit that contains, for example, a cryptographic engine that can validate certificates or otherwise send encrypted messages to other client units in the system.

By way of illustration, each of the certificate issuing units 102a-102n is cross certified with one or more certificate issuing units, as known in the art. This is illustrated by cross certificate lines 108a-108n. Each client unit 106a-106n communicates with its respective anchor certificate issuing unit via a suitable communication link illustrated generally at 110. This may include, but is not limited to, for example, a bus, network link, Internet link, wireless link or any other suitable communication link.

Each signed certificate set generator 104a-104n, may be a server or, for example, an executing software application, discrete logic, a plurality of processing units, or any other suitable structure that is operative to collect a plurality of cross certificates associated with at least one anchor certificate issuing unit that is operative to obtain all certificate issuing unit certificates for all of the cross certified certificate issuing units identified by the cross certificates' interest. The signed certificate set generators 104a-104n are operative to create a signed certificate set (SCS) identifying certificate issuing units determined to be trusted by the anchor certificate issuing unit, based on the cross certificates, wherein the signed certificate set includes at least a unique identifier, such as a distinguished name (DN), and a public key for each trusted certificate issuing unit that has been determined to meet certain trust criteria. As used herein, the public key of each trusted certificate issuing unit includes any index to such public keys to provide, for example, an indirect link (e.g. a DN of the trusted certificate issuing unit and a key identifier of the public key, along with a secure hash of the public key).

By way of illustration, certificate issuing unit 102c will be described although the same operations are performed by the other certificate issuing units in the community of interest. The signed certificate set generator 104c is shown as being incorporated as part of the certificate issuing unit 102c, but may be a separate server or other suitable device that performs the operations described herein. The signed certificate generator 104c after creating the signed certificate sets, stores the signed certificate sets (SCS) (see, e.g., FIG. 2) and publishes them in an SCS repository 112 such as an X.500-type directory or other suitable store that is accessible by the client units associated with the particular certificate issuing unit or that are associated with other certificate issuing units. As shown, client units 106c and 106d access the SCS repository 112 as indicated by dashed lines 114a and 114b. This access may be through any suitable form as known in the art for accessing, for example, X.500-type directories. Accordingly, the client units 106c and 106d are in operative communication with the signed certificate set generator 104c via communication links 110 or have access to the SCS's through suitable links 114a and 114b. Each client unit includes, for example, a software application that operates on one or more processing units to perform the operations described herein. Alternatively, each of the client units may have discrete logic or any suitable combination of hardware and software to perform the operations as described herein. Accordingly, the client units may be, for example, software applications, wireless devices, non-wireless devices, Internet appliances or any other suitable devices. Each client unit is operative to access the signed certificate set and to determine whether a received message from another client unit, for example, is from a trusted source, based on the signed certificate set. Each client unit 106c and 106d communicates, for example, with their anchor certificate issuing unit 102c to obtain, for example, their public key certificates signed by the anchor certificate issuing unit, as known in the art. In addition, the client units 106c and 106d also may request or otherwise obtain a suitable SCS from SCS repository 112 without communicating with the signed certificate set generator 104c.

Figure 2:
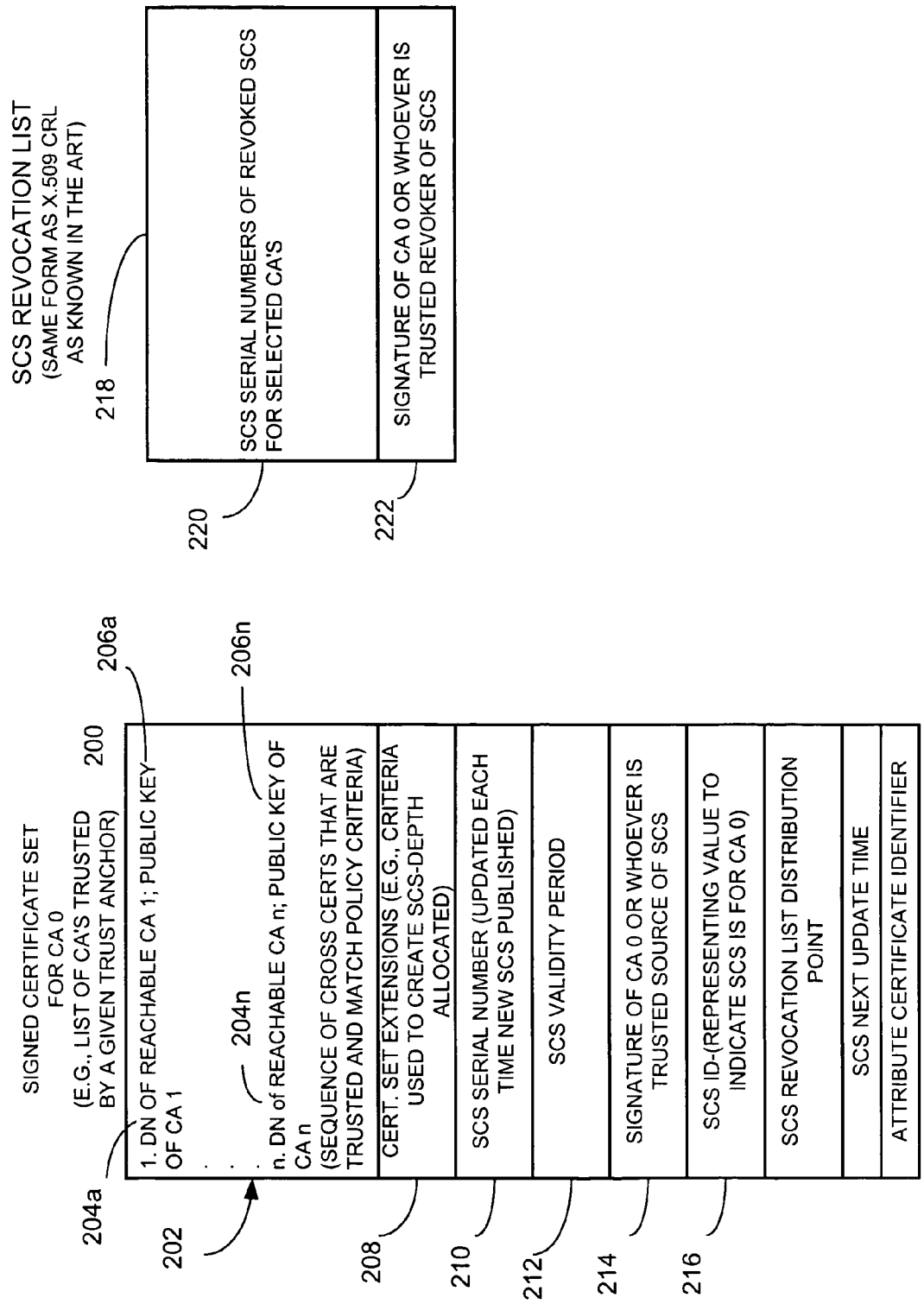
FIG. 2 graphically represents one example of a signed certificate set in accordance with one embodiment of the invention and a signed certificate set revocation list in accordance with one embodiment of the invention.
Figure 3:
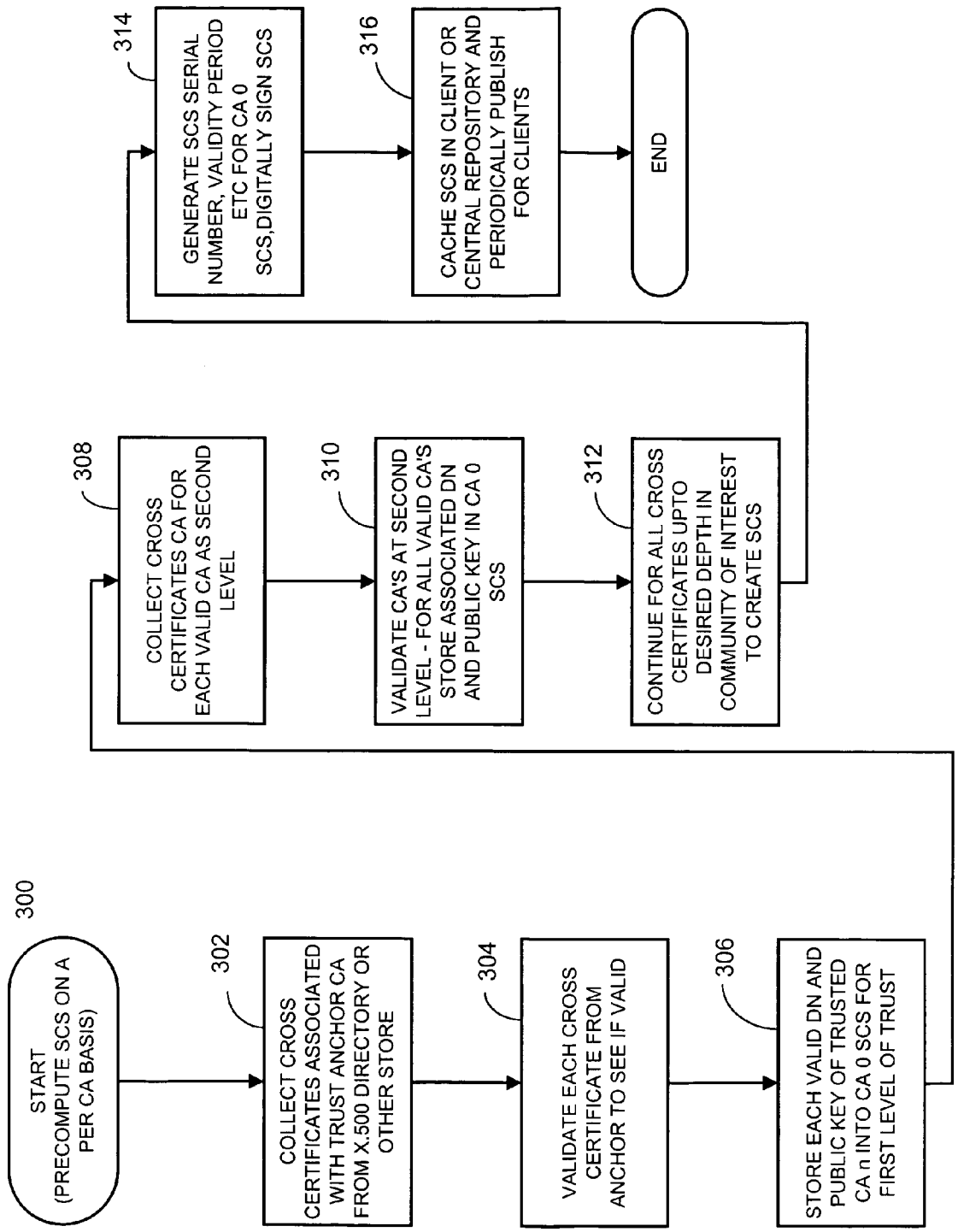
FIG. 3 is a flow chart illustrating one example of a method for determining validity of a certificate in a communication system employing cross certification among certificate issuing units in accordance with one embodiment of the invention.

Referring to FIGS. 1-3, signed certificate set generator 104a of certificate issuing unit 102a generates signed certificate set 200 which contains, for example, a list of CAs, trusted by trust anchor certificate issuing unit 102a. The signed certificate set 200 may contain no entries if no CA's are trusted by the anchor certificate issuing unit. The SCS 200 may be stored, for example, in the same SCS repository 112 or in a separate SCS repository (not shown) not necessarily associated with certificate issuing unit 102a. In this example, the generated SCS 200 includes a list 202 of unique CA identifiers 204a-204n, and associated public keys 206a-206n of each certificate issuing unit trusted by the anchor certificate issuing unit 102a. As such, the list 202 includes unique identifiers and associated public keys 204a-204n and 206a-206n of certificate issuing units 102b, 102c and 102n. For example, the signed certificate set generator 104a performs certificate validation of cross certificates from cross certification 108b to gain trust of certificate issuing unit 102b in conventional cross techniques, as known in the art. If the cross certificate of certificate issuing unit 102b is suitably validated, data from the certificate (or the certificate itself) is added to the list 202 along with a unique identifier 204a and its associated public key 206 (or reference the public key 206a, for example, a secure hash of the public key). Anchor certification issuing unit 102a will then collect additional cross certificates that include, for example, nested cross certificates (chained cross certificates) from the plurality of certificate issuing units 102c and 102n, for example, via the cross certificate relationships 108a and 108n, respectively. As known in the art, the cross certificates via relationship 108b may be stored in one or more data repositories, such as an X.500 directory, associated with the anchor certificate issuing units 102a and 102b. The data repository associated with the anchor certificate issuing unit 102b may also include cross certificates between certificate issuing 102b and 102n via the cross certificate relationship 108n, as known in the art.

By collecting and validating the plurality of cross certificates associated with certificate issuing units 102b-102n, identified by cross certificates, for example, in the data repository, the signed certificate set generator 104 creates the signed certificate set 200. For example, the list 202 would also include the unique identifier associated with certificate issuing unit 102n and its associated public key if there is a trust relationship via cross certificates with certificate issuing unit 102b which is trusted by the anchor certificate issuing unit 102a via cross certificate relationship 108b. Accordingly, the list 202 includes a sequence of cross certificates and/or just the public keys (or information sufficient to retrieve the public keys in a secure way, for example the public key identifier and a secure hash of the public key) of the trusted certificate issuing units determined to be valid via cross certification relationships.

In addition, the signed certificate set generator 104 does not include in the list 202 CA's that do not meet policy criteria. For example, if a trust relationship existed between certificate issuing units based on, for example, a cross certification relationship but one of the certificate issuing units did not have acceptable policy criteria, for example, did not provide certificates to its respective client units using a suitable strength encryption algorithm, for example, the signed certificate set generator would not allow the certificate issuing unit and its associated public key to be listed in list 202. Pruning the signed certificate set (SCS) of trusted certification authorities that are included on the list is based on, for example, predefined policy identifying information accessible by the signed certificate set generator. For example, a security officer may only allow certificate issuing units that comply with specified policy requirements so that its client units will trust only those certification issuing units that meet the policy criteria The procedure for applying policy criteria when finding chains of trusted CA-certificates and cross-certificates is known in the art. The required policies might be defined by a trust anchor as those suitable for a particular group of end-users or a particular application or group of applications. The policy might be identified, for example, in an attribute certificate that applies to a particular group of end-users. In a chain of cross-certificates that extends from the trust anchor to the trusted CA, each intermediate CA must meet the policy constraints; otherwise the chain is not valid and the CA will not be placed in the SCS on the basis of that particular certificate chain (however, there may be another chain that meets the policy criteria). The created SCS 200 also includes, if desired, SCS extensions 208 which may be data representing identifiers of the policy constraints that were applied in evaluating trust relationships. The certificate set generator may issue one or more SCS's, each one containing a set of CA's that are trusted under the application of a particular set of policy constraints. In another example, the signed certificate set generator might place in the signed certificate several groups of trusted CA's, along with identifiers of the policy constraints that were applied when evaluating trust in the set of CA's in each group.

The created signed certificate set 200 also includes, if desired, signed certificate set extensions 208 which may be data representing, for example, the depth level that the signed certificate set generator uses to determine which certificate issuing units and associated public keys can be placed in the list 202. For example, the signed certificate set generator 104a may be set, through a user interface, for example, to evaluate a limited certain depth of cross certification relationships. As a result, another certificate issuing unit, for example, would be cross certified with certificate issuing unit 102n, and with no other certificate issuing units, this additional depth level may or may not be used so that some certificate issuing units may not be evaluated for inclusion in the list 202.

The signed certificate set 200 may also include a signed certificate set serial number 210 which is updated each time a new SCS 200 is published, for example, in an SCS repository or X.500 directory. The SCS 200 may also include an SCS validity period 212 that defines the life of the SCS 200 after which time the SCS 200 is no longer trustworthy. It may also contain the date and time at which the SCS generator expects to issue the next SCS. It may also contain the identifier of a distribution point where the client may find revocation information for this particular SCS. For example, revocation information may be distributed by the SCS generator in the form of a SCS revocation list posted at a particular entry in an X.500 directory. For example, the format and method of distribution of the SCS revocation list may be similar to those of the X.509 certificate revocation list (CRL), as known in the art. The SCS 200 may also be signed to form the signed certificate set so that it is given a level of trust that is trusted by the client unit. The digital signature 214 results from the digitally signing of the created signed certificate set to provide a trusted signed certificate set for use by a client unit. The digital signature 214 may be, for example in this case, the digital signature of the anchor certification authority 102a or whichever authority is directly trusted by a respective client unit. A third party notary or other third party signatory may also digitally sign the SCS if desired. Also if desired, the SCS may include a policy identifier as noted above, used to create the signed certificate set such that certain policies are verified so that listed certification issuing units and associated public keys are included only from those certification authorities that comply with the identified policy information. The SCS 200 may also include an SCS identifier 216 that represents that it is an SCS associated with, in this case, certificate issuing unit 202a. This may be useful, for example, where SCS's are centrally stored for access by client units associated with differing trust anchor certificate issuing units such that a client unit may request and obtain an SCS defined by the SCS ID so that it only obtains its anchor certificate issuing unit. Once generated, the SCS is published and accessible by a plurality of different client units such as being published in the SCS repository 112 or in another suitable fashion.

The signed certificate set generator 104c or other suitable entity also may generate a signed certificate set revocation list 218 containing at least an identifier 220 of at least one signed certificate set that has been revoked by, for example, the signed certificate set generator 104a, or other suitable authority, or containing an identifier 220 that denotes that no signed certificate set has been revoked. The identifier 220 may be, for example, a list of SCS serial numbers 210 of revoked SCS for selected anchor certificate issuing units. This may be done, for example, via a certificate revocation list methodology as known in the art. The SCS revocation list 220 includes a digital signature 222 of, for example, the certificate issuing unit 102a or signed certificate set generator 104a or whichever entity is a trusted revoker of signed certificate sets. Accordingly, when a client unit requests an SCS from a respective repository it may also obtain the SCS revocation list 218 to indicate whether it can trust a cached or otherwise obtained SCS.

FIG. 3 illustrates a method for determining validity of a certificate by a recipient, (e.g., client) using, for example, the signed certificate set. As shown in block 300, the method begins with the start of the precomputation of an SCS on a per certificate issuing unit basis. This is done, for example, as shown in block 302 by collecting a plurality of cross certificates associated with a given trust anchor certificate issuing unit from, for example, an X.500 directory or other suitable storage medium or mediums. As shown in block 304, the method includes validating, by for example, the signed certificate set generator, each cross certificate associated with the anchor CA to see if the certificate is valid. As shown in block 306, the method includes storing each valid certificate, or at least an identifier and public key of a validated (i.e., trusted) certificate issuing unit into the list 202 for a first level of trust, meaning a direct cross certification with another certificate issuing unit.

As shown in block 308, if a signed certificate set generator is selected, for example, through a user interface or other suitable mechanism, to evaluate an additional trust depth, the signed certificate set generator will then collect additional cross certificates from a trusted certificate issuing unit for each valid certificate issuing unit at that second level of depth and add the validated identifiers for the respective certification issuing units and their public keys. As shown in block 310, after the collection of the certificates, the validation of each certificate occurs. As shown in block 312, this process continues for all cross certificates up to the desired depth in a community of interest to create the list 202 in the SCS. Once all of the unique identifiers and associated public keys of trusted certificate issuing units in a community of interest have been obtained, the list 202 and the other suitable information is digitally signed to generate the signed certificate set as shown in block 314. The signed certificate set may be then published so that it is accessible by a plurality of different client units.

As shown in block 316 from the client unit's perspective, the client unit may access the respective repository containing the SCS for its anchor certificate issuing unit and cache the most recent SCS in its internal memory so that it now contains a list of all CAs trusted by its anchor. When the client receives a message from a sending unit associated with a different anchor certificate issuing unit, the receiving unit need merely compare the issuer DN from the sender certificate with the DNs in the list 202 to determine if it can trust the public key that signed the sender certificate. The SCS contains the public key that can be used to validate the sender certificate. Accordingly, the client need not perform validation of each CA certificate in a chain. In addition, the sender need not attach a certificate chain to the message. Similarly, when the client sends an encrypted message to a receiving unit associated with a different anchor certificate issuing unit, the sending unit need merely compare the issuer DN in the receiver's certificate with the DNs in the list 202 to determine if it can trust the issuer of the receiving unit's certificate. The SCS contains the public key that can be used to validate the receiver's certificate. Moreover, the signed certificate set generator 104 periodically generates the SCS's for all CAs in the community of interest and need not perform this operation each time a message needs to be validated by a client unit.

Figure 4:
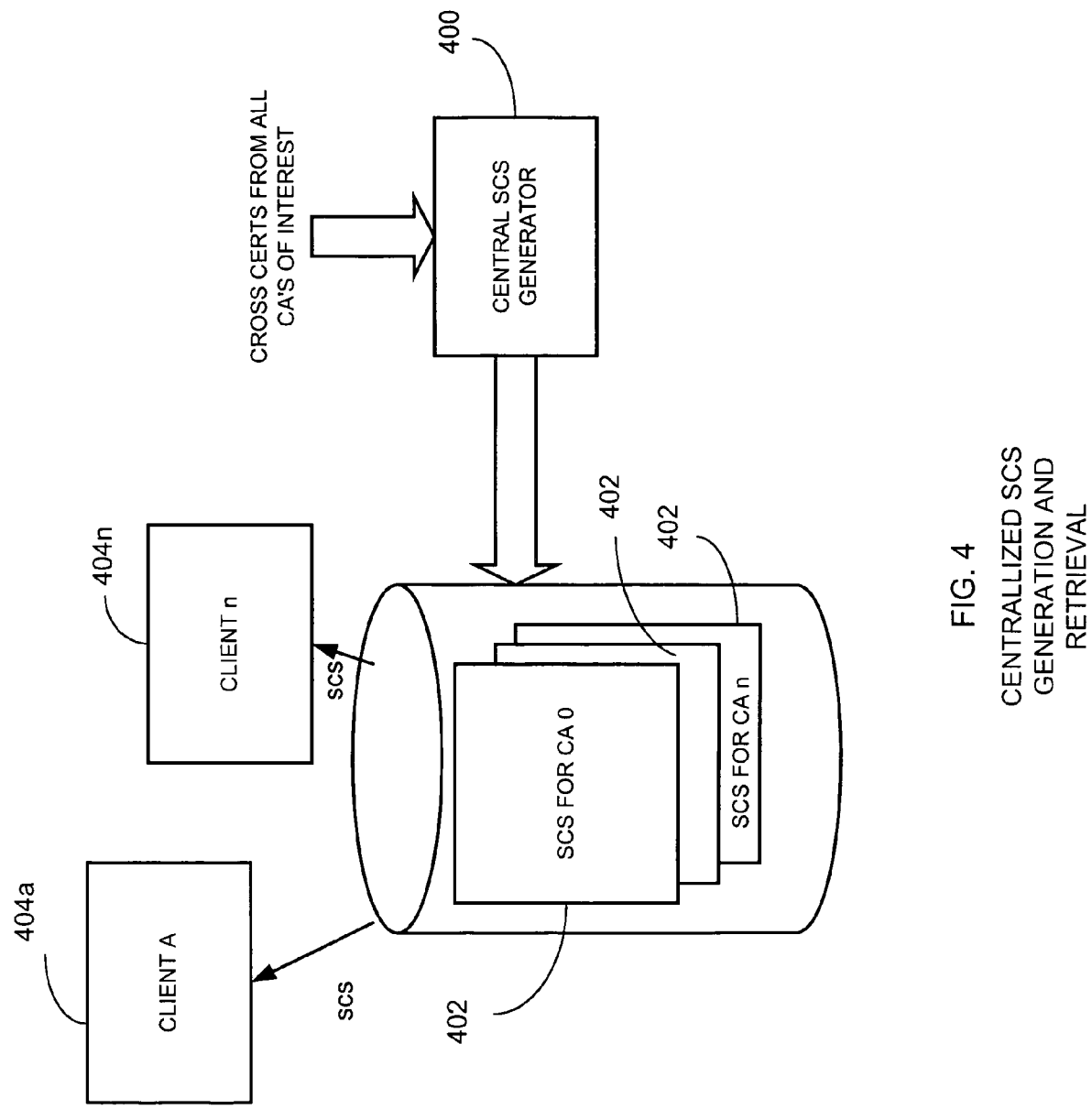
FIG. 4 is a block diagram illustrating another example of an apparatus that employs a signed certificate set centrally for a community of interest in accordance with one embodiment of the invention.

FIG. 4 illustrates an alternative embodiment wherein, for example, a single signed certificate set generator obtains and generate all SCSs for all certificate issuing units in a community of trust. As such, central SCS generator 400 centrally creates a plurality of signed certificate sets 402, on a per anchor certificate issuing unit basis. Each signed certificate set 402 includes at least a list of unique identifiers and associated public keys of each certificate issuing unit trusted by their respective anchor certificate issuing unit. The plurality of SCS's is then published in, for example, a common repository accessible by a plurality of different client units 404a-404n. Each SCS includes a digital signature of the generating trusted entity and a signed certificate set identifier associated with a given anchor certificate issuing unit. Preferably, although not required, each SCS includes a signed certificate set serial number generated each time a certificate set is published. Furthermore, each SCS might contain one or more lists of CA's, each list representing a set of CA's that are trusted on the basis of trust in a particular trust anchor or in a set of trust anchors and possibly with the application of a particular set of policy constraints.

As with the system in FIG. 1, a client unit verifies the digital signature on an obtained signed certificate set to determine if the signed certificate set is valid. The client unit verifies the signature on the SCS revocation list and checks whether the SCS was revoked and whether the signed certificate set needs to be regenerated for the anchor certificate issuing unit. For example, if the signed certificate set that has been cached by a client unit appears on an SCS revocation list, the client unit may request a new SCS directly from its anchor certificate issuing unit, or may again access the SCS repository to obtain an updated SCS for a given anchor certificate issuing unit. If the client unit deems that a fresh or more recently issued SCS should be used, the client unit may request that the SCS generating unit issue a fresh SCS, even if the SCS cached by the client does not appear on any SCS revocation list. The SCS generating unit may or may not respond immediately to client requests for a fresh SCS by generating a new SCS, sending it to the client unit, or posting it into an X.500 directory or other certificate repository. The SCS generating unit may respond to client requests based on criteria that the SCS generating unit itself applies; for example, it may generate and distribute a fresh SCS if it receives requests from sufficiently many client units within a certain time interval. Alternatively, for example, the SCS generating unit may simply generate a fresh SCS at periodic intervals. Alternatively, for example, the SCS generating unit may generate a fresh SCS when one or more of the trust relationships in the plurality of CA certificates or cross-certificates has changed; for example, it one or more of those certificates has been revoked. Also, the certificate set revocation list may also be posted into a X.500 directory or other repository to be accessible to a plurality of clients.

As described herein, the operations of the signed certificates generator may be carried out by one or more processing units based on executable instructions that may be stored, for example, in a storage medium containing memory that contains executable instructions that when read by one or more processing units causes the one or more processing units to perform the operations described herein. In addition, the operations of the client units, including, but not limited to, obtaining SCSs, and verifying the SCSs in response to desiring to approve a received message, may be performed by one or more processing units associated with a client unit. Accordingly, executable instructions may be stored on a storage medium so that the client unit can carry out the operations described herein. The storage medium may include, but is not limited to, volatile memory, non-volatile memory, including CD ROMs, distributed storage such as via the Internet, or any other suitable memory containing the requisite executable instructions.

Accordingly, based on the above apparatus and methods, the efficiency of validation of end-user certificates can be greatly improved by providing a client simply with a list of public keys associated with trusted certification authorities thereby eliminating the need for a client unit to validate each certificate in a chain of certificates each time a message is received. In addition, the above method and apparatus provides, among other advantages, the elimination of the need for a certificate issuing unit to continually perform validation of certificate chains since a signed certificate set generator may perform the operation for all certificate issuing units in a community of interest. Also, a signed certificate set generator may be programmed based on certain desired policy criteria to construct a signed certificate set starting from any number of root certificates. The signed certificate set generator may construct one or more SCS's each one based on a particular set of policy criteria and a particular anchor CA, or it may place one or more lists of trusted CA's within a single SCS, each list being constructed based on a particular set of policy criteria and trust anchor or anchors. Each SCS is managed such as management of its validity period and potentially expiry period. The SCS includes, for example, a list of trusted certificate issuing units or public keys indexed, for example, by appropriate identifiers such as the DN from the validated certificates. The user of the SCS allows the validation of end entity certificates without requiring chain construction or validation of CA certificates by a client unit. Validation of the SCS and validation of the sender or receiver's certificate using the public key in the SCS is all that is needed. Capability for the client unit to either cache the SCS or import the certificates or public keys to form a list into its own certificate trust lists is also quite useful.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method carried out by one or more devices, for determining validity of a certificate in a system employing cross certification among certificate issuing units comprising the steps of:

for a community of interest, collecting at least one cross certificate associated with an anchor certificate issuing unit including obtaining chained cross certificates from a plurality of certificate issuing units, and obtaining at least one certificate issuing unit public key and an associated unique identifier for a cross-certified certificate issuing unit identified by the at least one cross certificate; and creating a signed certificate set identifying a plurality of certificate issuing units determined to be trusted by the anchor certificate issuing unit, based on the at least one cross certificate, wherein the signed certificate set includes at least the unique identifier and the public key of each of the plurality of trusted certificate issuing units and an associated digital signature.

2. The method of claim 1 including the step of generating a signed certificate set revocation list containing at least an identifier of at least one signed certificate set that has been revoked.

3. The method of claim 1 including the step of publishing the signed certificate set of certificate issuing units wherein the published signed certificate set is accessible by a plurality of different clients units.

4. The method of claim 1 including the steps of:

generating a signed certificate set of certificate issuing units in response to requests by one or more client units;

distributing the signed certificate set to client units; and publishing the signed certificate set generated in response to client requests, wherein the published signed certificate set is accessible by a plurality of different clients units.

5. The method of claim 1 wherein the step of collecting the at least one cross certificate includes collecting cross certificates from a data repository associated with the anchor CA.

6. The method of claim 1 including the step of digitally signing the created signed certificate set of certificate issuing units trusted by the anchor certificate issuing unit to provide a trusted cross certificate signed certificate set for use by a client unit.

7. The method of claim 1 including the steps of:
creating a plurality of signed certificate sets on a per anchor certificate issuing unit basis wherein each signed certificate set contains at least: a list of unique identifiers and associated public keys of each certificate issuing unit trusted by an anchor certificate issuing unit, and
publishing each signed certificate set wherein each published signed certificate set is accessible by a plurality of different clients units.

8. The method of claim 7 wherein the step of creating the plurality of signed certificate sets on a per anchor certificate basis includes validating a digital signature associated with each cross certificate for a given anchor certificate issuing unit and including on a signed certificate set, only those certificate issuing units that had valid certificates.

9. The method of claim 1 including the step of caching, by a client unit, a copy of the signed certificate set of certificate issuing units trusted by the anchor certificate issuing unit and wherein the client unit does not perform validation of certificate issuing unit certificates but validates an end-entity certificate by seeing if the certificate issuing entity associated with the end-entity is on the cached signed certificate set and using the public key of that certificate issuing entity to validate the end-entity certificate.

10. The method of claim 1 including the step identifying trusted certificate issuing unit certificates, and applying policy constraints applicable for a particular trust anchor or a particular group of end entities or a particular group of client applications, and placing identifiers of those policy constraints in the signed certificate set that contains the list of trusted certificate issuing units.

11. An apparatus for use in determining validity of a certificate in a system employing trusted paths comprising:
a signed certificate set generator comprising one or more processors operative to collect at least one cross certificate associated with at least one anchor certificate issuing unit including obtaining chained cross certificates from a plurality of certificate issuing units, and obtain at least one certificate issuing unit public key and an associated unique identifier for a cross-certified certificate issuing unit identified by the at least one cross certificate; and operative to create a signed certificate set identifying certificate issuing units determined to be trusted by the anchor certificate issuing unit, based on the at least one cross certificates, wherein the signed certificate set includes at least a unique identifier and public key of each trusted certificate issuing unit and an associated digital signature.

12. The apparatus of claim 11 wherein the signed certificate set generator generates and publishes a signed certificate set revocation list containing at least an identifier of at least one signed certificate set that has been revoked.

13. The apparatus of claim 11 wherein the signed certificate set generator publishes the signed certificate set of certificate issuing units wherein the published signed certificate set is accessible by a plurality of different clients units.

14. The apparatus of claim 11 wherein the signed certificate set generator collects cross certificates from a data repository associated with the anchor CA.

15. The apparatus of claim 11 wherein the signed certificate set digitally signs the created signed certificate set of certificate issuing units trusted by the anchor certificate issuing unit to provide a trusted cross certificate signed certificate set for use by a client unit.

16. The apparatus of claim 11 wherein the signed certificate set generator:
creates a plurality of signed certificate sets on a per anchor certificate issuing unit basis wherein each signed certificate set contains at least: a list of unique identifiers and associated public keys of each certificate issuing units trusted by an anchor certificate issuing unit, and
publishes each signed certificate set wherein each published signed certificate set is accessible by a plurality of different clients units.

17. The apparatus of claim 11 wherein the signed certificate set generator creates the plurality of signed certificate sets on a per anchor certificate basis by validating a digital signature associated with each cross certificate for a given anchor certificate issuing unit and including on a signed certificate set, only those certificate issuing units that had valid certificates.

18. A trusted public key certificate system comprising:
a signed certificate set generator operative to collect a plurality of cross certificates associated with at least one anchor certificate issuing unit including obtaining chained cross certificates from a plurality of certificate issuing units, and obtain a plurality of certificate issuing unit public keys and associated unique identifiers for cross-certified certificate issuing units identified by the plurality of cross certificate; and operative to create a signed certificate set identifying certificate issuing units determined to be trusted by the anchor certificate issuing unit, based on the cross certificates, wherein the signed certificate set includes at least a unique identifier and public key of each trusted certificate issuing unit and an associated digital signature; and
at least one client unit in operative communication with the signed certificate set generator and operative to access the signed certificate set and to determine whether a received message is from a trusted source based on the signed certificate set.

19. The system of claim 18 wherein the signed certificate set generator generates a signed certificate set revocation list containing at least an identifier of at least one signed certificate set that has been revoked.

20. The system of claim 19 wherein the signed certificate set generator publishes the signed certificate set of certificate issuing units wherein the published signed certificate set is accessible by a plurality of different clients units.

21. The system of claim 18 wherein the signed certificate set generator:
creates a plurality of signed certificate sets on a per anchor certificate issuing unit basis wherein each signed certificate set contains at least: a list of unique identifiers and associated public keys of each certificate issuing units trusted by an anchor certificate issuing unit, and
publishes each signed certificate set wherein each published signed certificate set is accessible by a plurality of different clients units.

22. A storage medium comprising:
memory containing executable instructions that when read by one or more processors, causes the one or more processors to:

for a community of interest, collect at least one cross certificate associated with at least one anchor certificate issuing unit including obtaining chained cross certificates from a plurality of certificate issuing units, and obtain at least one certificate issuing unit public key and associated unique identifier for a cross-certified certificate issuing unit identified by the cross certificate; and create a signed certificate set identifying certificate issuing units determined to be trusted by the anchor certificate issuing unit, based on the at least one cross certificate, wherein the signed certificate set includes at least a unique identifier and public key of each trusted certificate issuing unit and an associated digital signature.

23. The storage medium of claim 22 wherein the memory contains executable instructions that when read by one or more processors, causes the one or more processors to:

generate a signed certificate set revocation list containing at least an identifier of at least one signed certificate set that has been revoked.

24. The storage medium of claim 22 wherein the memory contains executable instructions that when read by one or more processors, causes the one or more processors to:

publish the signed certificate set of certificate issuing units wherein the published signed certificate set is accessible by a plurality of different clients units.

25. The storage medium of claim 22 wherein the memory contains executable instructions that when read by one or more processors, causes the one or more processors to digitally sign the created signed certificate set of certificate issuing units trusted by the anchor certificate issuing unit to provide a trusted cross certificate signed certificate set for use by a client unit.

26. The storage medium of claim 22 wherein the memory contains executable instructions that when read by one or more processors, causes the one or more processors to:

create a plurality of signed certificate sets on a per anchor certificate issuing unit basis wherein each signed certificate set contains at least: a list of unique identifiers and associated public keys of each certificate issuing units trusted by an anchor certificate issuing unit, and publish each signed certificate set wherein each published signed certificate set is accessible by a plurality of different clients units.

27. The storage medium of claim 22 wherein the memory contains executable instructions that when read by one or more processors, causes the one or more processors to:

generate a signed certificate set of certificate issuing units in response to requests by one or more client units;

distribute the signed certificate set to client units; and publish the signed certificate set generated in response to client requests, wherein the published signed certificate set is accessible by a plurality of different clients units.

28. A method, carried out by one or more devices, for determining validity of a certificate in a system employing cross certification among certificate issuing units comprising the steps of:

for a community of interest, collecting at least one cross certificate associated with an anchor certificate issuing unit including obtaining chained cross certificates from a plurality of certificate issuing units, and obtaining at least one certificate issuing unit public key and an associated unique identifier for a cross-certified certificate issuing unit identified by the at least one cross certificate;

creating a signed certificate set identifying certificate issuing units determined to be trusted by the anchor certificate issuing unit, based on the at least one cross certificate, wherein the signed certificate set includes at least the unique identifier and the public key of each trusted certificate issuing unit and an associated digital signature; and adding at least one of a validity period, serial number, set extension, and policy identifier to the created signed certificate set.

29. A method for determining validity of a certificate in a system employing cross certification among certificate issuing units comprising the steps of:

for a community of interest, collecting at least one cross certificate associated with an anchor certificate issuing unit, and obtaining at least one certificate issuing unit public key and an associated unique identifier for a cross-certified certificate issuing unit identified by the at least one cross certificate;

creating a signed certificate set identifying certificate issuing units determined to be trusted by the anchor certificate issuing unit, based on the at least one cross certificate, wherein the signed certificate set includes at least the unique identifier and the public key of each trusted certificate issuing unit;

publishing the signed certificate set of certificate issuing units wherein the published signed certificate set is accessible by a plurality of different clients units; and determining, by a client unit if the signed certificate set of trusted certificate issuing units is revoked and whether the signed certificate set needs to be regenerated for the anchor certificate issuing unit.

30. A method, carried out by one or more devices, for determining validity of a certificate in a system employing cross certification among certificate issuing units comprising the steps of:

for a community of interest, collecting at least one cross certificate associated with an anchor certificate issuing unit including obtaining chained cross certificates from a plurality of certificate issuing units, and obtaining at least one certificate issuing unit public key and an associated unique identifier for a cross-certified certificate issuing unit identified by the at least one cross certificate;

creating a signed certificate set identifying certificate issuing units determined to be trusted by the anchor certificate issuing unit, based on the at least one cross certificate, wherein the signed certificate set includes at least the unique identifier and the public key of each trusted certificate issuing unit and an associated digital signature; and creating the signed certificate set of certificate issuing units trusted by the anchor certificate issuing unit includes generating a plurality of signed certificate sets on a per anchor certificate issuing unit basis wherein each signed certificate set contains at least: a list of unique identifiers and associated public keys of each certificate issuing units trusted by an anchor certificate issuing unit, and a digital signature of a trusted entity and a signed certificate set identifier associated with a given anchor certificate issuing unit.

31. A method for determining validity of a certificate in a system employing cross certification among certificate issuing units comprising the steps of:

for a community of interest, collecting at least one cross certificate associated with an anchor certificate issuing unit including obtaining chained cross certificates from a plurality of certificate issuing units, and obtaining at least one certificate issuing unit public key and an associated unique identifier for a cross-certified certificate issuing unit identified by the at least one cross certificate;

creating a signed certificate set identifying certificate issuing units determined to be trusted by the anchor certificate issuing unit, based on the at least one cross certificate, wherein the signed certificate set includes at least the unique identifier and the public key of each trusted certificate issuing unit and an associated digital signature; and generating a signed certificate set containing one or more of the following: signed certificate set extensions, a signed certificate set serial number generated each time a signed certificate set is published, an indication of the date and time at which a new signed certificate set is to be issued, an identifier that indicates where corresponding signed certificate set revocation list is posted, one or more identifiers that indicates the policy constraints under which the list of trusted CA's was constructed.

32. An apparatus for use in determining validity of a certificate in a system employing trusted paths comprising:

a signed certificate set generator operative to collect at least one cross certificate associated with at least one anchor certificate issuing unit including obtaining chained cross certificates from a plurality of certificate issuing units, and obtain at least one certificate issuing unit public key and an associated unique identifier for a cross-certified certificate issuing unit identified by the at least one cross certificate; and operative to create a signed certificate set identifying certificate issuing units determined to be trusted by the anchor certificate issuing unit, based on the at least one cross certificates, wherein the signed certificate set includes at least a unique identifier and public key of each trusted certificate issuing unit and an associated digital signature; and wherein the signed certificate set generator obtains chained cross certificates from a plurality of certificate issuing units to collect the plurality of cross certificates.

33. An apparatus for use in determining validity of a certificate in a system employing trusted paths comprising:

a signed certificate set generator operative to collect at least one cross certificate associated with at least one anchor certificate issuing unit including obtaining chained cross certificates from a plurality of certificate issuing units, and obtain at least one certificate issuing unit public key and an associated unique identifier for a cross-certified certificate issuing unit identified by the at least one cross certificate; and operative to create a signed certificate set identifying certificate issuing units determined to be trusted by the anchor certificate issuing unit, based on the at least one cross certificates, wherein the signed certificate set includes at least a unique identifier and public key of each trusted certificate issuing unit and an associated digital signature; and wherein the signed certificate set generator adds at least one of a validity period, serial number, set extension, and policy identifier to the created signed certificate set.

34. An apparatus for use in determining validity of a certificate in a system employing trusted paths comprising:

a signed certificate set generator operative to collect at least one cross certificate associated with at least one anchor certificate issuing unit, and obtain at least one certificate issuing unit public key and an associated unique identifier for a cross-certified certificate issuing unit identified by the at least one cross certificate; and operative to create a signed certificate set identifying certificate issuing units determined to be trusted by the anchor certificate issuing unit, based on the at least one cross certificates, wherein the signed certificate set includes at least a unique identifier and public key of each trusted certificate issuing unit and an associated digital signature; and wherein the signed certificate set generator generates a plurality of signed certificate sets on a per anchor certificate issuing unit basis wherein each signed certificate set contains at least: a list of unique identifiers and associated public keys of each certificate issuing units trusted by an anchor certificate issuing unit, signed certificate set extensions, a signed certificate set serial number generated each time a signed certificate set is published, a digital signature of a trusted entity and a signed certificate set identifier associated with a given anchor certificate issuing unit.

35. A storage medium comprising:

memory containing executable instructions that when read by one or more processors, causes the one or more processors to:

for a community of interest, collect at least one cross certificate associated with at least one anchor certificate issuing unit including obtaining chained cross certificates from a plurality of certificate issuing units, and obtain at least one certificate issuing unit public key and associated unique identifier for a cross-certified certificate issuing unit identified by the cross certificate;

create a signed certificate set identifying certificate issuing units determined to be trusted by the anchor certificate issuing unit, based on the at least one cross certificate, wherein the signed certificate set includes at least a unique identifier and public key of each trusted certificate issuing unit and an associated digital signature; and wherein the memory contains executable instructions that when read by one or more processors, causes the one or more processors to add at least one of a validity period, serial number, set extension, and policy identifier to the created signed certificate set.

36. A storage medium comprising:

memory containing executable instructions that when read by one or more processors, causes the one or more processors to:

for a community of interest, collect at least one cross certificate associated with at least one anchor certificate issuing unit including obtaining chained cross certificates from a plurality of certificate issuing units, and obtain at least one certificate issuing unit public key and associated unique identifier for a cross-certified certificate issuing unit identified by the cross certificate;

create a signed certificate set identifying certificate issuing units determined to be trusted by the anchor certificate issuing unit, based on the at least one cross certificate, wherein the signed certificate set includes at least a unique identifier and public key of each trusted certificate issuing unit and an associated digital signature; and wherein the memory contains executable instructions that when read by one or more processors, causes the one or more processors to collect all cross certificates associated with the at least one anchor certificate issuing unit and obtaining all certificate issuing unit certificates identified by the cross certificates.

* * * * *